(12) United States Patent
Loopstra (10) Patent No.: US 11,969,119 B2
(45) Date of Patent: Apr. 30, 2024

(54) APPARATUS AND METHOD FOR GRINDING COFFEE

(71) Applicant: KONINKLIJKE PHILIPS N.V., Eindhoven (NL)

(72) Inventor: Kasper Roelof Loopstra, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/771,872

(22) PCT Filed: Oct. 20, 2020

(86) PCT No.: PCT/EP2020/079420
§ 371 (c)(1),
(2) Date: Apr. 26, 2022

(87) PCT Pub. No.: WO2021/083716
PCT Pub. Date: May 6, 2021

(65) Prior Publication Data
US 2022/0386816 A1    Dec. 8, 2022

(30) Foreign Application Priority Data

Oct. 28, 2019    (EP) .................................... 19205539

(51) Int. Cl.
*A47J 42/06*    (2006.01)
*A47J 42/44*    (2006.01)
*A47J 42/46*    (2006.01)

(52) U.S. Cl.
CPC ............... *A47J 42/06* (2013.01); *A47J 42/44* (2013.01); *A47J 42/46* (2013.01)

(58) Field of Classification Search
CPC .................................. A47J 42/44; A47J 31/42
See application file for complete search history.

(56) References Cited

U.S. PATENT DOCUMENTS 2,699,899 A * 1/1955 Dale ....................... A47J 42/44
241/36
4,172,413 A * 10/1979 Roseberry ............... A47J 31/42
99/282
(Continued)

FOREIGN PATENT DOCUMENTS

| CH | 353496 A | 4/1961 |
|---|---|---|
| EP | 1800577 A1 | 6/2007 |

(Continued)

OTHER PUBLICATIONS

Extended European Search Report issued in connection with corresponding EP Application No. 19205539.0 dated Mar. 19, 2020.
(Continued)

*Primary Examiner* — Matthew Katcoff
*Assistant Examiner* — Mohammed S. Alawadi
(74) *Attorney, Agent, or Firm* — Schott, P.C.

(57) ABSTRACT

An apparatus for grinding coffee is described. The apparatus includes a mechanical user input device, a grinding unit for grinding coffee, an electrical switch which connects the grinding unit to a source of electrical power and a mechanical coupling for the mechanical coupling of the user input device to the grinding unit. The user input device provides electrical power to the grinding unit when it is displaced from an initial position and ceases the provision of electrical power to the grinding unit when it is in the initial position. The mechanical coupling returns the user input device to the initial position when the grinding unit is operational.

14 Claims, 8 Drawing Sheets

(56) References Cited

U.S. PATENT DOCUMENTS

| | | | |
|---|---|---|---|
| 4,872,403 A | | 10/1989 | LaGesse et al. |
| 2018/0199750 A1* | | 7/2018 | Hulett .................. A47J 31/404 |

FOREIGN PATENT DOCUMENTS

| | | | |
|---|---|---|---|
| FR | 68949 E | 7/1958 | |
| FR | 2265253 A7 | 10/1975 | |
| WO | 8701570 A1 | 3/1987 | |
| WO | 2010121949 A1 | 10/2010 | |

OTHER PUBLICATIONS

International Search Report and Written Opinion issued in connection with corresponding PCT Application No. PCT/EP2020/079420 dated Dec. 18, 2020.

\* cited by examiner

APPARATUS AND METHOD FOR GRINDING COFFEE

CROSS-REFERENCE TO RELATED APPLICATIONS

The present application is a U.S. National Phase application under 35 U.S.C. § 371 of International Application No. PCT/EP2020/079420, filed on Oct. 20, 2020, which claims the benefit of European Patent Application No. 19205539.0, filed on Oct. 28, 2019. These applications are hereby incorporated by reference herein.

FIELD OF THE INVENTION

This invention relates to the field of coffee grinding, and more specifically to the field of coffee grinding for coffee making by a coffee machine.

BACKGROUND OF INVENTION

Typically, automatic coffee machines include a grinder in which coffee beans are ground into coffee grounds, as freshly ground coffee contains more of the natural taste and aromas than pre-ground coffee. In an espresso coffee machine, the machine then compresses the coffee grounds and passes hot water through the compressed coffee grounds to create an espresso coffee drink.

The grinders in these machines are configured in such a way that the grinder is controlled to grind a certain predetermined amount of coffee beans. The taste of espresso coffee depends on (among other things) the ratio between water volume and ground coffee amount, and different users have different preferences for taste.

Currently this ratio can be adapted on many espresso coffee machines, but often involves the user navigating through a set of non-intuitive brewing settings in the user interface. A control system is then needed for the grinding unit, so that the grinding unit is controlled to grind an amount of coffee beans based on the brewing settings selected by the user. This complexity increases the cost of manufacturing, and thus increases the retail price of the coffee machines.

U.S. Pat. No. 4,172,413 discloses a hopper and grinder in which a rotary knob is turned manually to select an amount of coffee beans to grind, as a number of cups. When the rotary knob is not in its home position, a switch is closed, and this switch enables power to be provided to a timer motor and to a grinder motor. When the rotary knob reaches the initial position, the power is removed from the motors.

U.S. Pat. No. 2,699,899 discloses a coffee grinder and dispenser. In one example, operating power for a time control mechanism is mechanically coupled from the grinder motor via a set of pulleys.

There is therefore a need for a simple way of selecting the amount of coffee to be ground by the grinder without the need of excessively complicating the design of the coffee machine or of the user interface.

SUMMARY OF THE INVENTION

The invention is defined by the claims.

According to examples in accordance with an aspect of the invention, there is provided an apparatus for grinding coffee, comprising:

a mechanical user input device, wherein the user input device comprises a plurality of positions, at least one of which being an initial position;

a grinding unit for grinding coffee;

an electrical switch which connects the grinding unit to a source of electrical power; and a mechanical coupling for the mechanical coupling of the user input device to the grinding unit, wherein the user input device is configured to:

close the electrical switch when the user input device is displaced from the initial position; and open the electrical switch when the user input device is in the initial position, and wherein the mechanical coupling is configured to return the user input device to the initial position when the grinding unit is operational.

The apparatus allows the user to select the amount of coffee to be ground by the grinding unit. The apparatus closes the electrical switch when the mechanical user input device is displaced from the initial position. The electrical switch is part of an electrical circuit between the grinding unit and a source of electrical power. When the switch is closed, electrical power is provided to the grinding unit such that when the mechanical user input device is moved by the user, the grinding unit begins grinding coffee. A mechanical coupling couples the grinding unit to the mechanical user input device such that when the grinding unit is operational, the mechanical user input device returns to the initial position. The purpose of the mechanical coupling is to drive the mechanical user input device back to the initial position, driven by the rotation of the grinding unit. The number of rotations the grinding unit performs determines how much coffee will be ground. This number of rotations is determined by the transmission characteristics of the mechanical coupling and the amount of displacement by which the user input device is displaced from its initial position by the user. The mechanical selection of the amount of coffee to be ground simplifies the interaction between the user and coffee machine.

The grinding unit may have a plurality of grind size settings. In this way, the grind size may be selected according to a type of coffee drink to be made. For example, coarse grounds may be desired for a filter coffee, whereas fine grounds may be desired for an espresso coffee.

The mechanical coupling or an additional, second coupling may be provided for controlling the grind size setting in dependence on the position of the user input device. In this way, the grind size may be adjusted automatically based on the same user input. This may in particularly be advantageous in case where the desired grind size depends on the amount of coffee being brewed. For instance, a small coffee amount such as for an espresso coffee typically benefits from smaller grounds than a large coffee amount, such as a jug of filter coffee.

The mechanical coupling for example comprises an arrangement of gears such as worm wheels or cycloid gears, or belts. Thus, any mechanical linkage may be used which translates the rotation of the grinding unit (e.g. the rotation of an output shaft of a grinder motor or another rotary part of the grinding unit) into a returning movement of the user input device. The operation of the grinding unit returns the user input device to its initial position. When the user input device is moved (e.g. rotated or translated away) from its initial position, it is preferably decoupled from the grinding unit. For example, a ratchet or similar one-way clutch mechanism, may allow decoupling of the user input device from the grinding unit when the position is set (e.g. clockwise rotation of a rotary knob) and couples the user input device to the grinding unit when the user input device returns to the initial position (e.g., counterclockwise rotation of the rotary knob).

The user input device for example comprises a rotary or translatory knob, wherein the range of rotary, respectively translatory movement of the knob comprises a plurality of sub-ranges, wherein each sub-range is associated with a different coffee volume to be brewed using the ground coffee.

In this way, the position of the user input device may set both an amount and strength of coffee.

The mechanical coupling may return the user input device to the initial position at a rate, which is dependent on its current displacement from the initial position. For example, the further the user input device is displaced by the user, the slower the user input device is returned to the initial position, and thus allowing a non-linear dosage-displacement relation.

The user input device may comprise a push-pull rotary knob wherein an output signal is generated in dependence on the push-pull setting. This output signal may be used by the controller of a coffee machine, when the apparatus is integrated into a coffee machine. For example, different coffee drink types may be selected based on the push-pull setting.

The invention also provides a coffee machine comprising:
an apparatus as defined above;
a brewing chamber for receiving ground coffee from the grinder; and
a controller for controlling a brewing process of the coffee machine.

The apparatus is then used as an integrated part of a coffee machine.

The apparatus may further comprise a detector for detecting when the grinder is operational and the controller is coupled to the detector.

In this way, the controller is made aware of when grinding is taking place, for example so that coffee brewing can be commenced when grinding has been detected as finished. An additional option is that the amount of water to be used is determined and controlled based on the setting of the user input device, as described further below.

The electrical switch and the detector may together comprise a dual pole, dual throw switch. Thus, a single component may be used for control of the grinding and for detection that grinding is taking place.

The user input device may comprise a push-pull rotary knob, and an output signal dependent on the push-pull setting is provided to the controller.

The controller can then be provided with additional information from the user input device. For example, the coffee machine may comprise a plurality of brewing settings, and the push-pull setting is for selecting a brewing setting.

The coffee machine for example further comprises a water reservoir, a water heater and a water delivery system for delivering heating water to the brewing chamber, and the controller is adapted to select an amount of water in dependence on the user input device setting selected by the user.

In this way, the position of the user input selected by the user may be used to control both a strength of the coffee to be made as well as the quantity.

As mentioned above, the user input device may comprise a rotary knob or a translatory (or slidable) knob, and the range of movement of the knob comprises a plurality of sub-ranges, wherein each sub-range is associated with a different amount of water.

There may for example be two sub-ranges, for allowing selection of one or two cups of coffee, or there may be more sub-ranges, for example for one or more of: one cup, two cups, a small jug, a medium jug and a large jug. The controller will then use one of a set of possible volumes. For example, if there is the option of one cup or two cups, if the user input device is set within the first 180 degrees, the controller will provide a volume of water for one cup, and for a setting within the second 180 degrees, the controller will provide a volume of water for two cups.

The brewing process takes place after grinding. In order to determine simply the setting of the user input device, the controller may simply time the duration of the grinding process (using the detector signal), which depends on the position to which the user input device was set.

The controller may control brewing settings in dependence on the position of the user input device, so that the controller controls how the coffee is brewed in dependence on the amount of coffee that is ground by the grinder.

These brewing settings may include the amount of water, as explained above, but also additional settings such as the flowrate and pressure of the water. This may for example be of interest if large amount of coffee is ground to brew a drip filter-like coffee.

The invention also provides a method for grinding coffee, the method comprising;
receiving a user setting based on movement of a mechanical user input device away from an initial position;
operating a grinder;
returning the user input to the initial position using a mechanical coupling between the grinder and the user input device; and
ceasing operation of the grinder when the user input device is in the initial position.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an apparatus for grinding coffee, hereinafter also simply referred to as a grinder or coffee grinder, which comprises a mechanical user input device, a grinding unit for grinding coffee, an electrical switch which connects the grinding unit to a source of electrical power and a mechanical coupling for the mechanical coupling of the user input device to the grinding unit. The user input device is configured to provide electrical power to the grinding unit when it is displaced from an initial position and cease the provision of electrical power to the grinding unit when it is in the initial position. The mechanical coupling is configured to return the user input device to the initial position when the grinding unit is operational or, in other words, the mechanical coupling is configured to translate rotation of the grinding unit (or a part thereof) into a returning movement of the user input device.

Figure 1A:
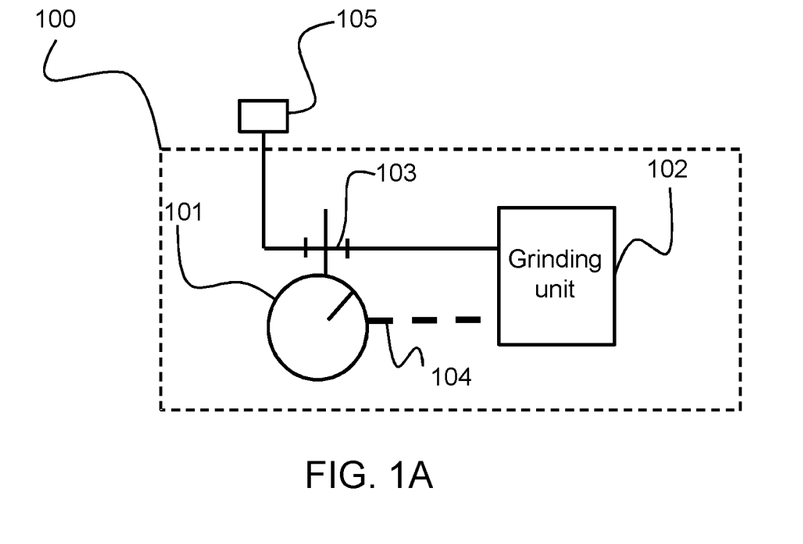
FIGS. 1A and 1B show schematics for an apparatus, i.e. a grinder, with the electronic switch closed in FIG. 1A and open in FIG. 1B.
Figure 1B:
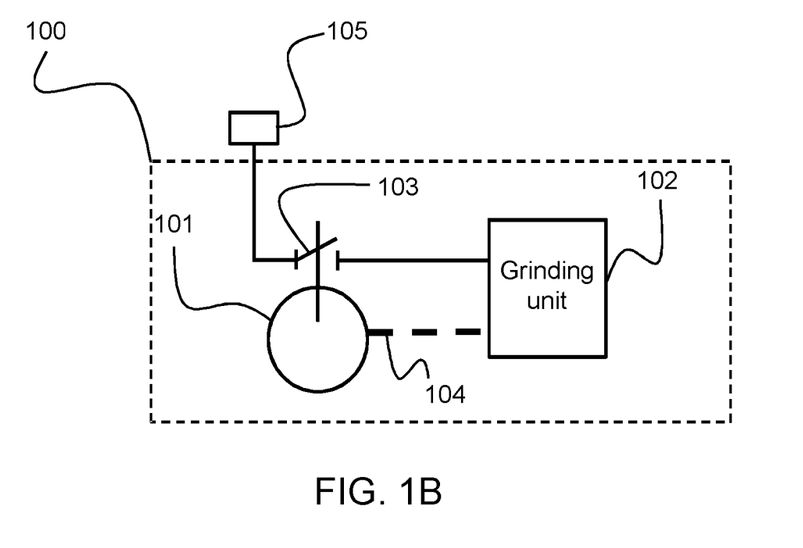

FIGS. 1A and 1B show an example of an apparatus 100 for grinding coffee, i.e. a coffee grinder.

The coffee grinder comprises a mechanical user input device 101, wherein the user input device 101 comprises a plurality of positions, at least one of which being an initial position. A motor driven grinding unit 102 is provided for grinding coffee beans received in a collection vessel, i.e. hopper (not shown). An electrical switch 103 connects the grinder and more particularly the grinding unit to a source of electrical power 105. The electrical switch 103 thus controls the actuation of the grinding unit motor, and hence the operation of the grinder.

A mechanical coupling 104 provides mechanical coupling of the user input device 101 to the grinding unit 102. The user input device 101 is configured to provide electrical power to the grinding unit 102 motor when the user input device 101 is displaced from the initial position and cease the provision of electrical power to the grinding unit 102 when the user input device 101 is in the initial position.

The mechanical coupling 104 is configured to return the user input device 101 to the initial position when the grinding unit 102 is operational. In particular, rotation of the grinding unit motor drives the user input device 101 back to the initial position.

FIG. 1A shows the electrical switch 103 in a closed state, when the user input device 101 is not in the initial position, and FIG. 1B shows the electrical switch 103 in an open state, when the user input device 101 is in the initial position.

When the user displaces the user input device 101, in order to select an amount of coffee to be ground, the electrical switch 103 is automatically closed. This can be achieved by, for example, having the electrical switch 103 formed as two electrodes below the user input device 101 and a conducting material on the inner part of the user input device 101. The user input device 101 is then configured such that when it is at the initial position, the conducting material does not make contact with the electrodes, and when the user input device 101 is displaced from the initial position, the conducing material makes contact with both electrodes, allowing electrical power to be conducted from one electrode to the other, therefore closing the switch. Thus, a simple contact switch may be used.

Figure 2:
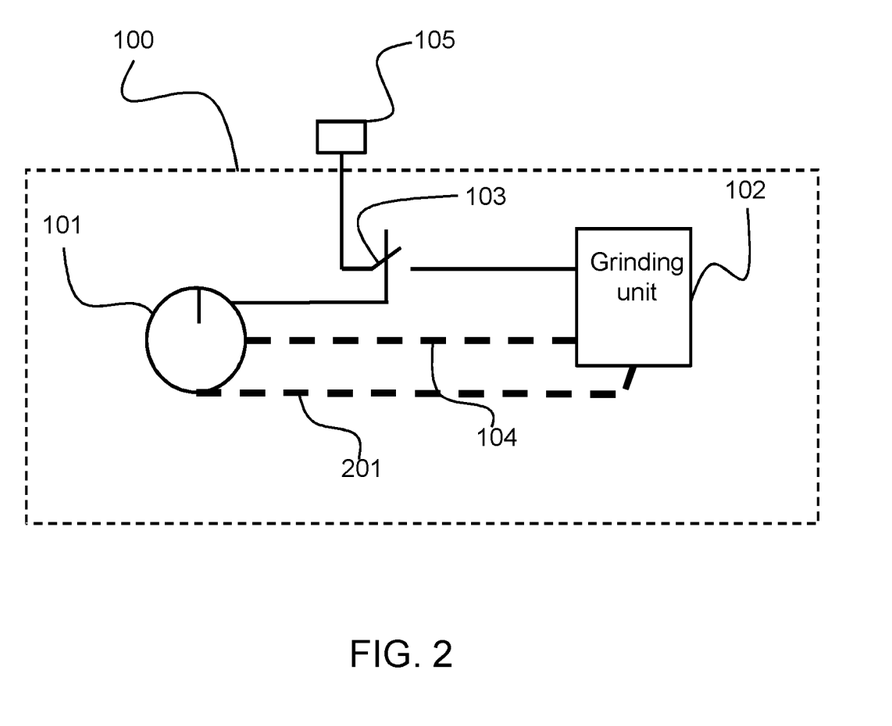
FIG. 2 shows a schematic representation of a grinder with a second coupling between the user input device and the grinder.

FIG. 2 shows a schematic diagram of a grinder with a second coupling 201 between the user input device 101 and the grinding unit 102. This second coupling 201 is configured to translate a setting of the user input device 101 to a grind size setting of the grinding unit 102. For example, choosing a long grind time (displacing the user input device 101 far from its initial position) will move the grind size to a very coarse setting. When the grinding unit 102 is approaching the end of its run, it will return to a finer setting. This will allow a large brew (jug) to use mostly coarse grind with only a bit of fine grind on top. The next brew can then be an espresso using fine grind. This second coupling will allow for a combined drip-and-espresso device with appropriate grounds being used with only a single user input. For example, this second coupling can be achieved using mechanical gears and/or a fulcrum.

Figure 3:
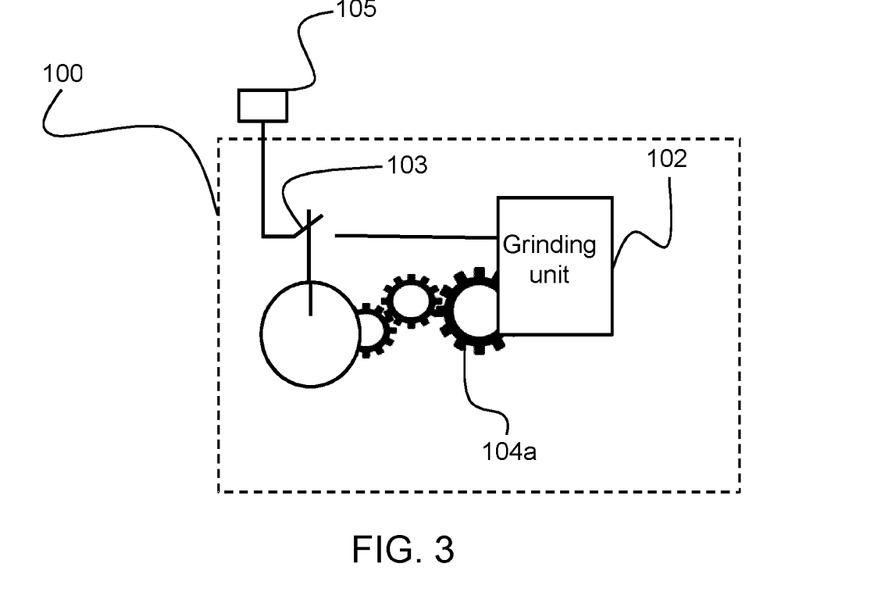
FIG. 3 shows a schematic representation of a grinder with an arrangement of gears.

FIG. 3 shows a schematic diagram of a grinder 100 with a mechanical coupling 104 comprising an arrangement of gears 104a. The gears 104a allow the rotational motion of the grinding unit 102 to be translated into a returning motion of the user input device 101 towards its initial position. The mechanical coupling 104 for example comprises an arrangement of gears 104a such as worm wheels, cogs or cycloid gears, or belts. Different types of mechanical couplings may be combined. Thus, any mechanical linkage may be used which translates the rotation of the grinding unit 102 (e.g., the rotation of an output shaft of a grinder motor or other rotary element within the grinder unit) into movement of the user input device 101. The operation of the grinding unit 102 returns the user input device 101 to its initial position. A one-way clutch may be provided to automatically decouple the user input device 101 from the grinding unit 102 when the former is moved (e.g. rotated or translated) away from it is initial position. For example, a ratchet mechanism may allow decoupling of the user input device 101 from the grinding unit 102 when the position is set (e.g. clockwise rotation of a rotary knob, or a translation to the right of a sliding knob) and couples the user input device 101 to the grinding unit 102 when the user input device returns to the initial position (e.g., counterclockwise rotation of the rotary knob, or translation to the left of the sliding knob). The user input device 101 may be decoupled from the grinder unit in other ways to allow movement of the user input device without movement of the grinder unit. For example, the user input device may be pulled out or pushed in (against a spring bias) to implement the decoupling.

The number of rotations after which and/or the speed at which the user input device 101 then returns to the initial position will depend on the combination of gears and the angular velocity of the grinding unit 102. In an example, the arrangement of gears 104a from the grinding unit 102 to the user input device 101 has a large reduction of, for example, 2400×. This large reduction allows a large amount of coffee to be ground when the user input device 101 is displaced far from the initial positon. This could be achieved using multiple worm wheels or cycloid gears.

Alternatively, advanced gearing can be used such that the speed at which the user input device 101 returns to the initial position can be made dependent on the amount of displacement by which the user input device 101 has been displaced from the initial position. For example, displacing the user input device 101 further can make the user input device 101 return slower, allowing a non-linear dosage-rotation relation. In this way, the user input device returns to the initial position at a rate which is dependent on its current displacement from the initial position. This can allow for a finer adjustment of coffee strength for low-dose brews (espresso) while also allowing a large amount of coffee to be ground over the course of, for example, a minute or more (jug brew).

This may be achieved using a suitable gear arrangement, such as worm gears, wherein the pitch of the worm gear is non uniform. The worm gear may convert between linear movement and rotation, wherein at different positions along the linear movement range, there is a different ratio of conversion of rotational to linear movement. This may be combined with other gearings to provide the desired overall gear ratio.

Figure 4:
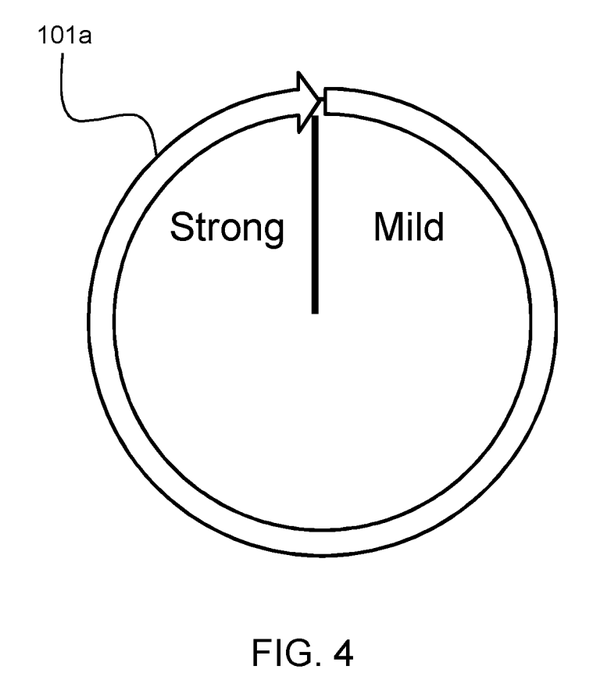
FIG. 4 shows an example of user input device in the form of a rotary dial.

FIG. 4 shows an example of a user input device 101, in the form of a rotary dial 101a. This dial 101a is connected to the electrical switch 103. The electrical switch 103 powers the grinding unit 102 when the dial 101a is not in the initial position. Once the grinding unit 102 is powered, it will rotate the dial 101a back to the initial position via mechanical coupling 104. This will take a certain number of rotations of the grinder motor output shaft (or other rotary element within the grinder unit to which the rotary dial is connected) determined by the transmission characteristics of the mechanical coupling and the amount of rotation of the dial 101a as selected by the user. This in turn allows the user to select the number of turns the grinding unit 102 should make and allows the user to determine the amount of coffee to be ground.

The grinder can be used to provide the desired amount of coffee grounds and, optionally, the desired coarseness of the coffee grounds for coffee making devices. The user can use the user input device 101 to select an amount of coffee to be ground, and thus the strength of the coffee the user will make. The dial 101a can be annotated with the amount of coffee that will be ground, at certain displacements, e.g. at a set of pre-calculated angles from the dial's initial position. For example, at 90 degrees from the initial position, the dial 101a could be annotated with "5 grams", to show the user that when the dial 101a is rotated to that angle, the grinding unit 102 will grind five grams of coffee.

Alternatively, the dial 101a could be annotated with the number of cups of coffee which will be ground. For example, at 45 degrees from the initial position, the dial 101a could be annotated with "1 cup". The dial 101a could also be further annotated, for example, with "1 mild cup" at 20 degrees from the initial position and "1 strong coffee" at 70 degrees from the initial position, to give the user further information of how much coffee they are grinding.

Figure 5:
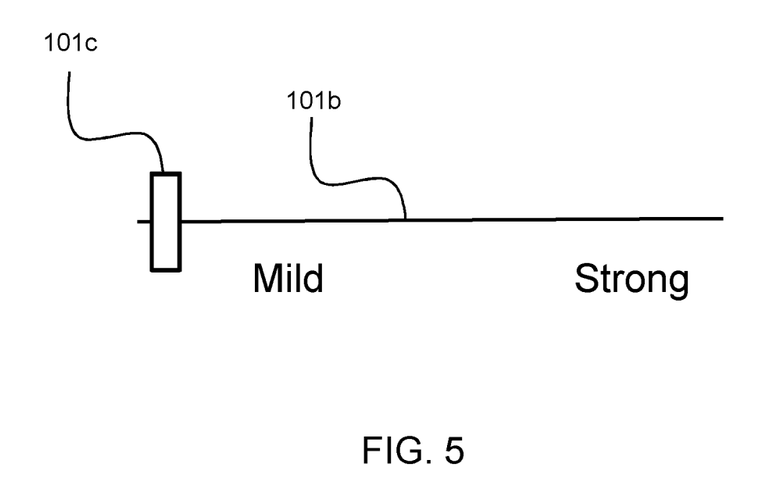
FIG. 5 shows a further example of a user input device comprising a sliding mechanism and a sliding knob.

FIG. 5 shows a further example of a user input device 101 comprising a sliding mechanism 101b and a sliding knob 101c. The sliding mechanism 101b will power the grinding unit 102 if the sliding knob 101c is displaced away from its initial position, placed to the left extremity in this FIG. 5. The sliding mechanism 101b can be annotated at a set of pre-calculated positions with the amount of coffee that will be ground. For example, when the knob 101c is positioned at 1 centimeter from the initial position, the sliding mechanism 101b could be annotated with "5 grams", to show the user that when the knob 101c is moved by that amount, the grinding unit 102 will grind five grams of coffee. The sliding mechanism may comprise a worm gear that converts rotary motion of the grinder unit to linear motion.

Alternatively, the sliding mechanism 101b could be annotated with the amounts of cups of coffee that will be ground. For example, at 2 centimeters from the initial position, the sliding mechanism 101b could be annotated with "1 cup". The sliding mechanism 101b could also be further annotated, for example, with "1 mild cup" at 1 centimeter from the initial position and "1 strong coffee" at 3 centimeters from the initial position, to give the user further information of how much coffee they are grinding for their desired coffee strength.

The grinder described above can be used as a stand-alone grinder, in conjunction with other coffee making devices that require ready-ground coffee. Examples of this include a stovetop or electric coffee maker (also known as a Moka Pot), a coffee cafetiére (also known as a French press) and a drip filter coffee machine. The grinder can provide fresh coffee grounds for better coffee quality from these devices.

The grinder can also be used as a stand-alone grinder used in conjunction with a manual espresso machine. In a manual espresso machine, a user fills a coffee receiving vessel, known as a portafilter, with coffee grounds from a grinder. The user then needs to tamp the coffee grounds within the portafilter with sufficient pressure, such as around 200 N, to create a so-called puck. The portafilter is then mounted to the coffee machine, usually via a bayonet type of connection. Next, the coffee machine drives hot water through the puck in the portafilter and the resulting coffee is dispensed via a spout that is typically integrated in the portafilter. After brewing, the user may disconnect and empty the portafilter, throwing away the used coffee grounds. The grinder can be used to grind the coffee into the desired amount of coffee grounds, which are then put into the portafilter.

Thus, the grinder may be used to grind coffee to create coffee grounds for any desired purpose.

In preferred examples, the coffee grinder is integrated into a coffee machine.

Figure 11:
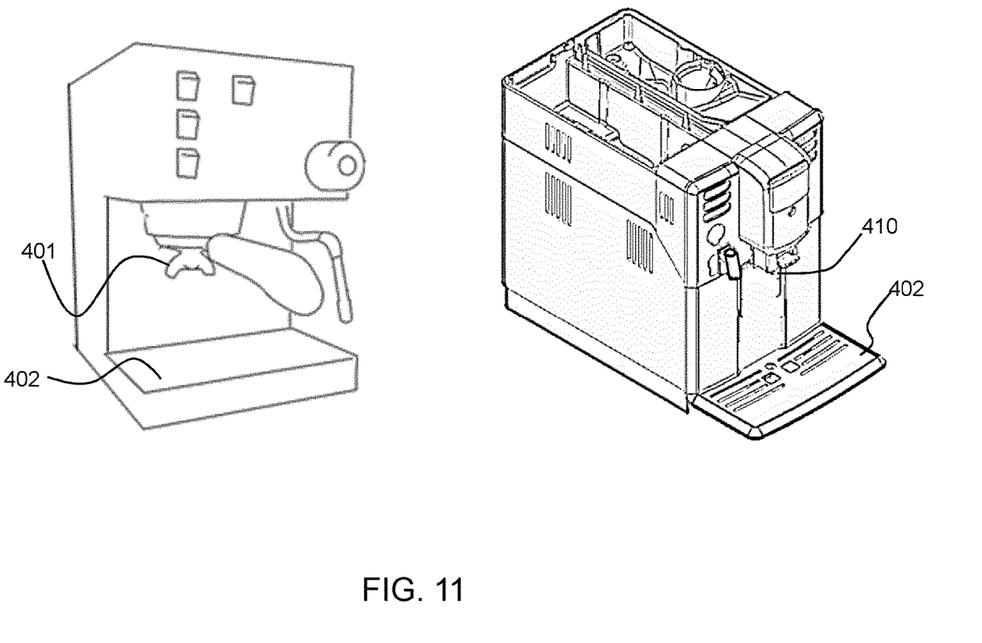
FIG. 11 shows an example of a hybrid coffee machine and a typical fully automatic coffee machine, which may each internally use the grinder of the invention.

For example, the grinder can be built into a fully automatic coffee machine as illustrated in FIG. 11 to the right. In a fully automatic espresso machine, all of the steps performed by the user in a manual espresso machine are done automatically by the automatic coffee machine. The coffee grounds made by the grinder are transported into a brewing chamber and tamped automatically, via a piston that may be hydraulically actuated or actuated via an electromotor. Next, hot water is driven through the coffee grounds in the brewing chamber, coffee is brewed and dispensed, and the used coffee grounds are discharged from the brew chamber into a waste bin within the machine.

There also exist hybrid coffee machines with a removable portafilter as used in a manual espresso machine, but which have the grinder integrated within the machine. The grinder described above could also be integrated into such a hybrid coffee machine, of which an example is illustrated in FIG. 11 to the left. The coffee grounds from the grinder are directly delivered to an inserted portafilter. The portafilter functions as the brewing chamber, and a piston may be used for automatically tamping and thereby compacting the coffee grounds in the portafilter before pressurized hot water is delivered to the portafilter 401.

This hybrid design thus combines elements from a manual espresso machine and a fully automatic espresso machine. In this type of machine, the user thus only needs to connect the empty portafilter to the machine. The grinding, closing of the brewing chamber and tamping of the ground coffee, hot water delivery and coffee dispensing is then automated as in a fully automated machine.

The user selects the amount and/or strength they desire by selecting the quantity of ground coffee by means of the user input device, as described above. After brewing, the user may disconnect the portafilter and discharge the coffee waste, similarly to the way a manual espresso machine is used.

Figure 6:
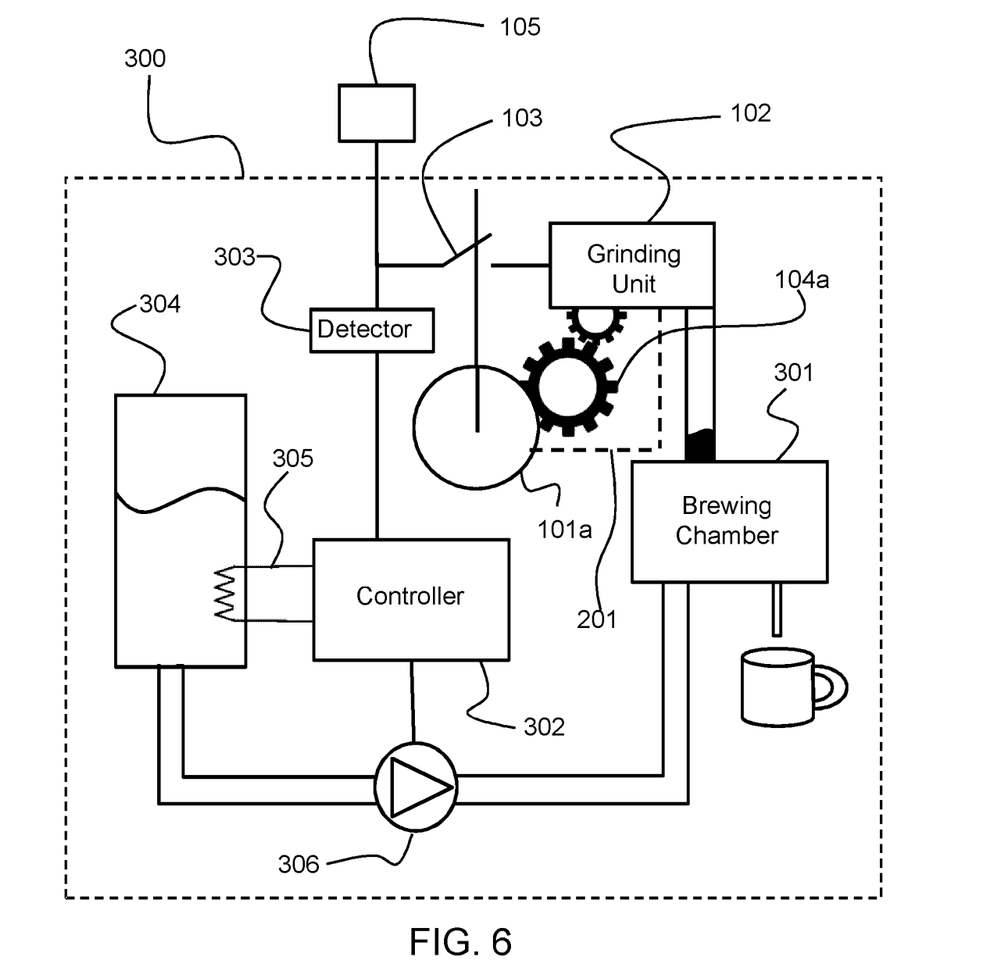
FIG. 6 shows a schematic representation of a coffee machine.

FIG. 6 shows a schematic diagram of a coffee machine 300 using the coffee grinder described above, shown as components 102, 103 and 105. FIG. 6 may be considered to show a fully automatic machine or a hybrid machine and only shows the parts of the coffee machine relevant to the grinding and brewing process (and not the parts relating to the removal of waste, which differs between hybrid and fully automatic machines).

FIG. 6 shows a brewing chamber 301 for receiving the coffee grounds. A controller 302 controls the coffee making process. There is a water reservoir 304 in which the water is heated by a heater 305 (or there may instead be an in-line heater such as a thermoblock at an output from the water reservoir). The water reservoir connects through a pump 306 to the brewing chamber 301 for delivering heated pressurized water to the brewing chamber. The brewing chamber may be formed by a portafilter in the case of a hybrid machine or it may be an internal brewing chamber in the case of a fully automatic machine. The pump and heater are controlled by the controller.

A detector 303 detects when the grinder is operating, based on the user input device 101 being displaced from its initial position. The user input device may be a dial 101a, as illustrated or a slider, as illustrated in FIG. 5.

When the dial 101a is displaced from its initial position, the switch 103 is closed. This provides electrical power to the grinding unit 102 which starts grinding coffee beans. The grinding function is dependent on the displacement of the dial 101a. Optionally, a second coupling 201 may be provided, as illustrated in dotted lines, to select the grounds size, as described in relation to FIG. 2. The detector 303 then detects that the grinding unit 102 is operational. To that end, the detector 303 may for instance comprise a power meter. The controller 302 can time the duration of the grinding process, which depends on the displacement of the user input device, e.g. the angle to which the dial 101a was set. The controller then heats up water in the water reservoir 304 with the water heater 305 to the desired temperature, typically above 90 degrees Celsius. The controller 302 then operates the pump 306 to deliver heated water to the brewing chamber 301 through a water delivery system. The ground coffee from the grinding unit 102 is also delivered to the brewing chamber 301, where the coffee is brewed. Whilst the grinding unit 102 is grinding, the gears 104a turn, thus turning the dial 101a back to the initial position.

Figure 7:
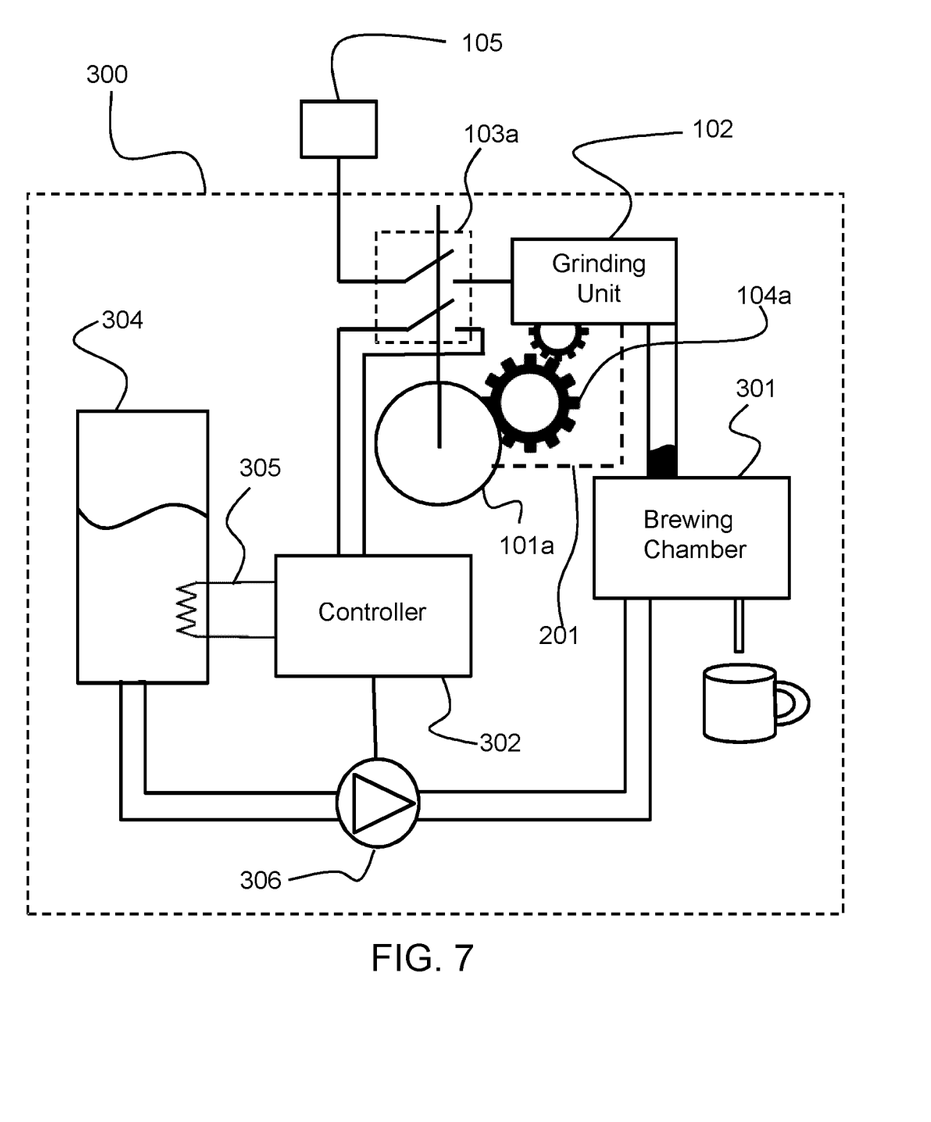
FIG. 7 shows a schematic representation of a coffee machine with a dual pole, dual throw switch.

FIG. 7 shows a schematic diagram for a coffee machine with a dual pole, dual throw switch 103a, which combines the electrical switch 103 and detector 303 of FIG. 6. When the dial 101a is rotated from its initial position, the dual pole, dual throw switch 103a provides electrical power 105 to the grinding unit 102 and closes a circuit in the controller 302 configured to indicate that the grinding unit 102 is operational. The setting at which the grinding unit 102 grounds is again dependent on the position of the dial 101a and optionally the second coupling 201. Once the gears 104a return the dial 101a to the initial position, the switch 103a is disconnected such that the controller 302 is made aware that the grinding unit 102 is no longer operational. The coffee machine functions as described above.

Figure 8:
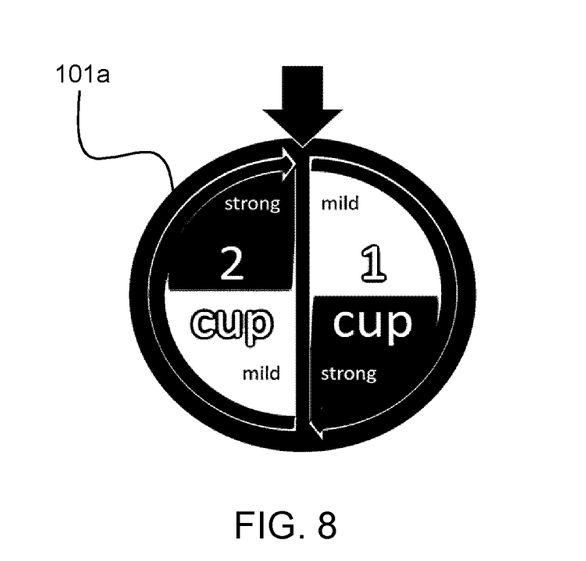
FIG. 8 shows an example of a rotary dial with two volume options.

FIG. 8 shows an example of a rotary dial 101a with two volume options. When included in a coffee machine 300, the controller 302 will then select an appropriate volume of water to be delivered, and hence coffee to be brewed, according to the amount of coffee ground. The controller 203 will only use one of two possible volumes, one or two cups of espresso, in FIG. 8. This allows the user to select a small amount of grounds for a certain volume of water by grinding a small amount of coffee (only moving the user input device 101 a bit, e.g. over an angle smaller than 90 degrees) for a mild taste, or a stronger taste by moving the user input device 101 further, e.g. over an angle larger than 90 degrees but smaller than 180 degrees. For example, if the dial 101a is moved more than 180 degrees, the controller 302 will add more water, giving two cups of espresso. For two strong espressos the dial 101a should be moved almost an entire rotation, e.g. between 270 and 360 degrees.

In this way, the user input device has a range of rotary movement (shown as 360 degrees, but the full range does not need to be a full revolution), and this range of movement is divided into two sub-ranges, namely the first and second 180 degrees sections in this example. Each sub-range is associated with a different coffee volume to be brewed using the ground coffee.

Figure 9:
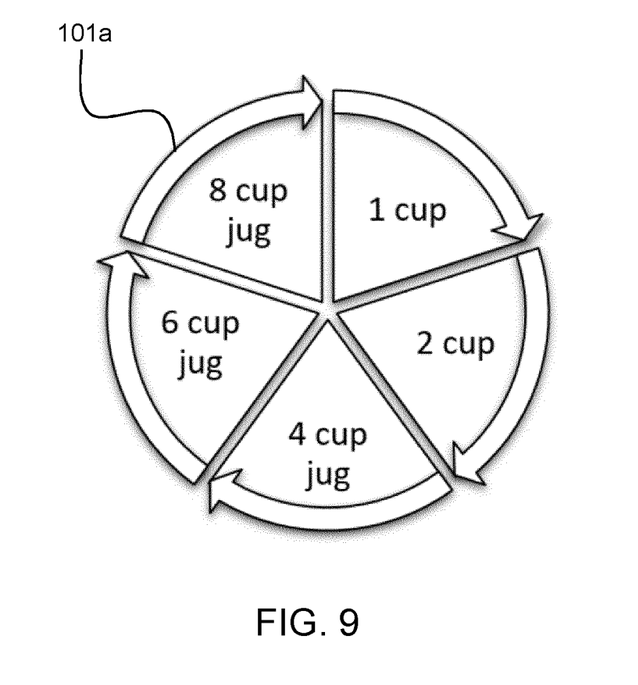
FIG. 9 shows an example of a rotary dial with multiple volume options.

FIG. 9 shows an example of a rotary dial 101a with multiple volume options. In this example there are five sub-ranges. When included in a coffee machine 300, the controller 302 can select from a set of five different volumes, from one or two cups of coffee to different jug sizes. In addition, the controller 302 can choose to use different brewing settings for different coffee grounds amounts. For instance, if a large amount of coffee is ground for a jug, the controller 302 can reduce the flowrate and pressure of the water to brew a drip filter coffee instead of an espresso.

It will be clear that similar volume options/sub-ranges can be implemented in the slider 101b,c of FIG. 5.

Figure 10A:
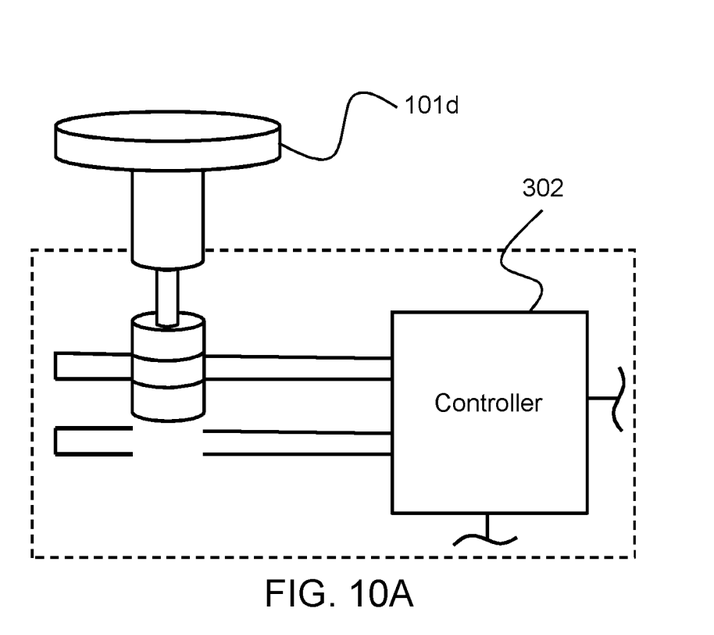
FIGS. 10A and 10B show a push-pull switch, interacting with a controller, with the switch being in a pulled state in FIG. 10A and in a pushed state in FIG. 10B.
Figure 10B:
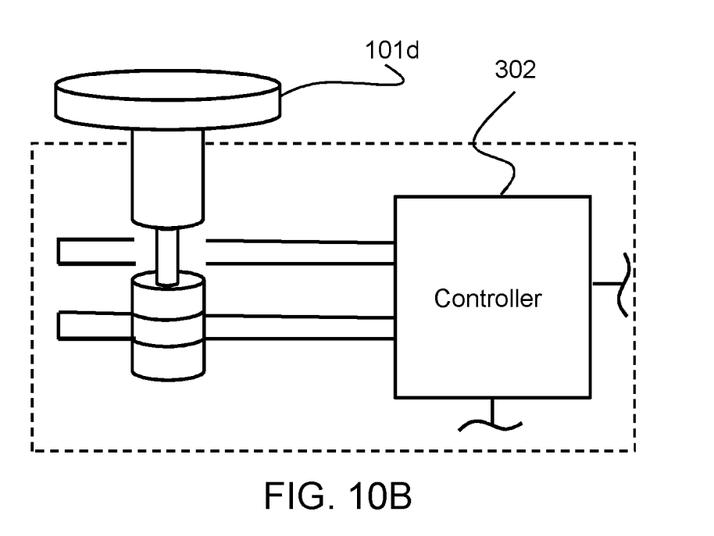

FIGS. 10A and 10B show the user interface implemented as both a rotary knob and a push-pull switch 101d, with the switch 101d being in a pulled state in FIG. 10A and in a pushed state in FIG. 10B. The switch 101d allows the user to give more input to the grinding unit 102 and/or the controller 302, for instance, requesting a lungo by pulling out the push-pull switch before rotating it. The push-pull switch may also allow the user to select the quantity from two different settings. For example, when it is not pulled, the grinding unit 102 can grind the selected amount of coffee with a fine grind and a small volume of coffee can be brewed. When the push-pull switch 101d is pulled, the grinding unit 102 can grind the selected amount with a coarse grind and a jug of coffee can be brewed.

FIG. 11 shows in the left image a hybrid machine and in the right image a fully automatic coffee machine.

The hybrid coffee machine has an external portafilter 401. The drink is delivered from the portafilter to a vessel placed on a drip tray 402. The grinder may deliver coffee grounds to the portafilter 401 internally from an internal grinder (not shown). When the portafilter 401 is attached to the coffee machine, it is typically rotated to secure the portafilter 401.

The hybrid coffee machine and the portafilter 401 can be configured such that the amount of rotation of the portafilter 401 when mounted to the coffee machine could select the amount of coffee to be ground, therefore being used as the user input device 101. Thus a separate control knob is not required for the strength (and optionally quantity) selection.

It may be performed as part of the process of coupling the portafilter to the main body of the coffee machine.

The fully automatic coffee machine has a coffee delivery spout 410. The coffee grinding takes place internally, with an internal coffee beans reservoir, grinder, grounds delivery chute and internal brew chamber.

There exist many types of coffee machines, some of which are manual whilst some are automatic as explained above. All of these coffee machines require coffee beans to be ground such that they can be brewed and they may all make use of the apparatus described above.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. An apparatus for grinding coffee, comprising:
   a mechanical user input device, wherein the mechanical user input device comprises a plurality of positions, at least one of which being an initial position;
   a grinding unit for grinding coffee;
   an electrical switch which connects the grinding unit to a source of electrical power;
   a mechanical coupling for mechanically coupling the mechanical user input device to the grinding unit; and
   a one-way clutch to automatically decouple the mechanical user input device from the grinding unit when the mechanical user input device is moved away from the initial position,
   wherein the mechanical user input device is configured to:
      close the electrical switch when the mechanical user input device is displaced from the initial position; and
      open the electrical switch when the mechanical user input device is in the initial position, and
   wherein transmission characteristics of the mechanical coupling are configured to return the mechanical user input device to the initial position when the grinding unit is operational, such that an amount of displacement by which the mechanical user input device is displaced from its initial position determines a number of rotations that the grinding unit performs, which in turn determines an amount of coffee to be ground.

2. The apparatus of claim 1, wherein the grinding unit has a plurality of grind size settings.

3. The apparatus of claim 2, further comprising a second coupling for controlling the grind size setting in dependence on the position of the mechanical user input device.

4. The apparatus of claim 1, wherein the mechanical coupling comprises an arrangement of gears such as worm wheels, or cycloid gears, or belts.

5. The apparatus of claim 1, wherein the mechanical user input device comprises a rotary knob or a translatory knob, wherein a range of rotary, respectively translatory movement of the rotary knob or the translatory knob comprises a plurality of sub-ranges, and wherein each sub-range is associated with a different coffee volume to be brewed using the ground coffee.

6. The apparatus of claim 1, further comprising a gear arrangement which is adapted to return the mechanical user input device to the initial position at a rate which is dependent on its current displacement from the initial position.

7. A method for grinding coffee, the method comprising:
   receiving a user setting based on movement of a mechanical user input device away from an initial position, wherein the mechanical user input device is automatically decoupled from a grinding unit using a one-way clutch when the mechanical user input device is moved from the initial position;
   operating the grinding unit;
   returning the mechanical user input device to the initial position using a mechanical coupling between the grinding unit and the mechanical user input device; and
   ceasing operation of the grinding unit when the mechanical user input device is in the initial position.

8. A coffee machine, comprising:
   an apparatus for grinding coffee, comprising:
      a mechanical user input device, wherein the mechanical user input device comprises a plurality of positions, at least one of which being an initial position;
      a grinding unit for grinding coffee;
      an electrical switch which connects the grinding unit to a source of electrical power; and
      a mechanical coupling for mechanically coupling the mechanical user input device to the grinding unit,
      wherein the mechanical user input device is configured to:
         close the electrical switch when the mechanical user input device is displaced from the initial position; and
         open the electrical switch when the mechanical user input device is in the initial position, and
      wherein transmission characteristics of the mechanical coupling are configured to return the mechanical user input device to the initial position when the grinding unit is operational, such that an amount of displacement by which the mechanical user input device is displaced from its initial position determines a number of rotations that the grinding unit performs, which in turn determines an amount of coffee to be ground;
   a brewing chamber for receiving ground coffee from the grinding unit; and
   a controller for controlling a brewing process of the coffee machine,
   wherein the apparatus further comprises:
      a detector for detecting when the grinding unit is operational and the controller is coupled to the detector.

9. The coffee machine of claim 8, wherein the electrical switch and the detector together comprise a dual pole, dual throw switch.

10. The coffee machine of claim 8, further comprising a water reservoir, a water heater, and a water delivery system for delivering heating water to the brewing chamber, wherein the controller is adapted to select an amount of water in dependence on a mechanical user input device setting selected by the user.

11. The coffee machine of claim 10, wherein the mechanical user input device comprises a rotary knob, wherein a range of rotary movement of the rotary knob comprises a plurality of sub-ranges, and wherein each sub-range is associated with a different amount of water.

12. The coffee machine of claim 8, wherein the controller is adapted to select brewing settings dependant on a position of the mechanical user input device.

13. A coffee machine, comprising:
- an apparatus for grinding coffee, comprising:
  - a mechanical user input device, wherein the mechanical user input device comprises a plurality of positions, at least one of which being an initial position;
  - a grinding unit for grinding coffee;
  - an electrical switch which connects the grinding unit to a source of electrical power; and
  - a mechanical coupling for mechanically coupling the mechanical user input device to the grinding unit,
  - wherein the mechanical user input device is configured to:
    - close the electrical switch when the mechanical user input device is displaced from the initial position; and
    - open the electrical switch when the mechanical user input device is in the initial position, and
  - wherein transmission characteristics of the mechanical coupling are configured to return the mechanical user input device to the initial position when the grinding unit is operational, such that an amount of displacement by which the mechanical user input device is displaced from its initial position determines a number of rotations that the grinding unit performs, which in turn determines an amount of coffee to be ground;
- a brewing chamber for receiving ground coffee from the grinding unit; and
- a controller for controlling a brewing process of the coffee machine,
- wherein the mechanical user input device comprises a push-pull rotary knob, and wherein an output signal dependent on a push-pull setting is provided to the controller.

14. The coffee machine of claim 13, further comprising a plurality of brewing settings, wherein the push-pull setting is for selecting a brewing setting.

* * * * *